G. W. BINGHAM.
PERFORATING MACHINE.
APPLICATION FILED OCT. 23, 1918.
1,389,618.
Patented Sept. 6, 1921.
2 SHEETS—SHEET 1.
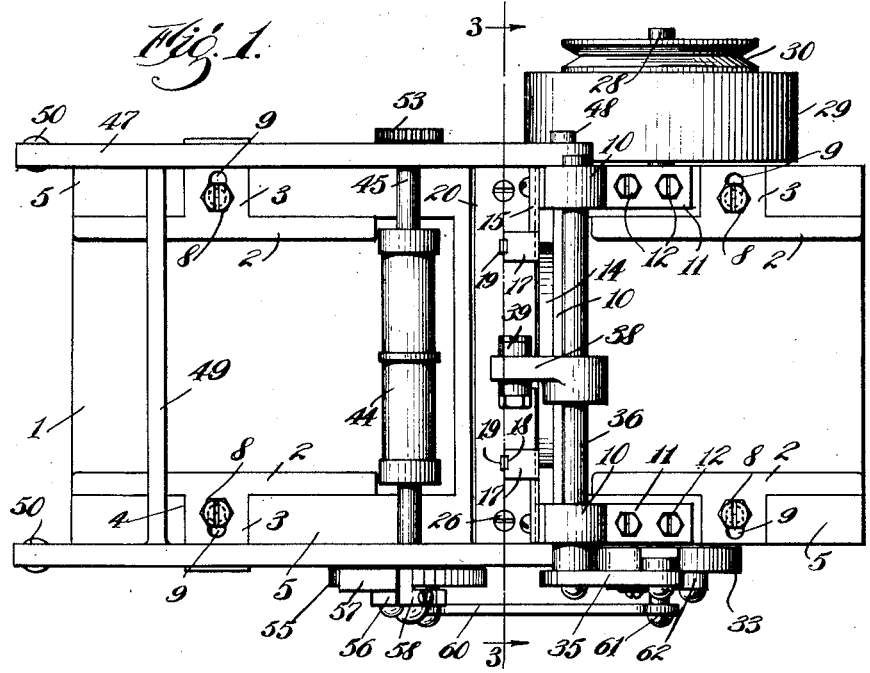
Inventor,
George W. Bingham.
By Hull, Smith, Brock & West
Attys.

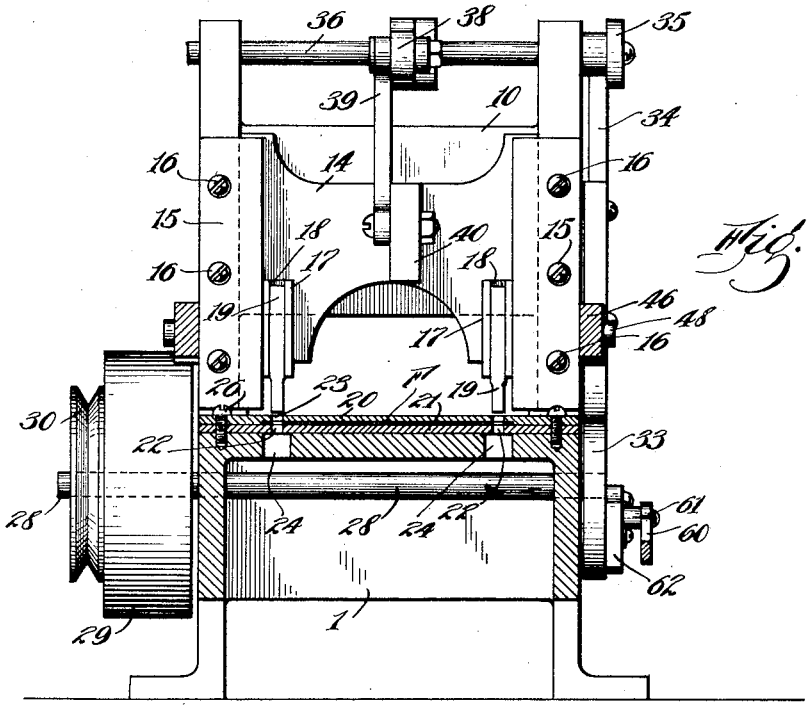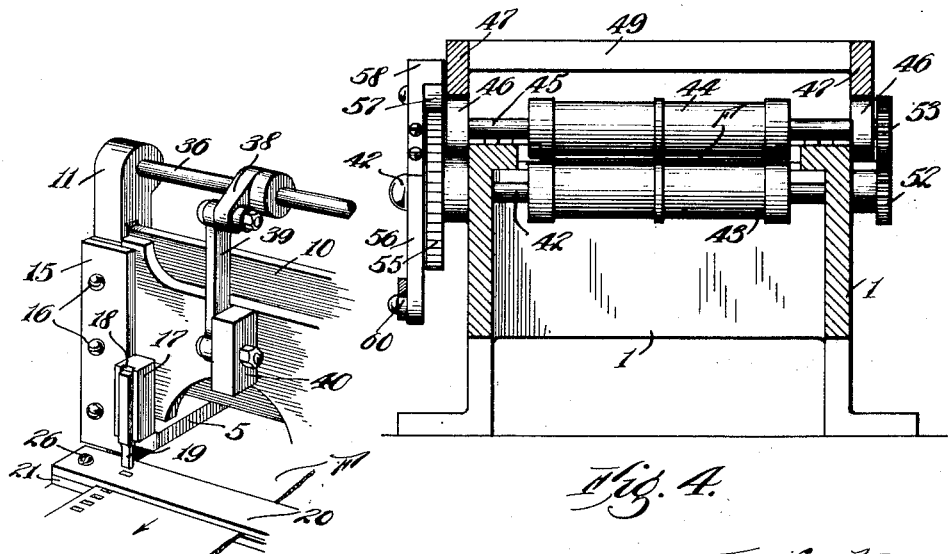

UNITED STATES PATENT OFFICE.

GEORGE W. BINGHAM, OF CLEVELAND, OHIO, ASSIGNOR TO THE INTERNATIONAL MOVING PICTURE & FILM COMPANY, OF NASHVILLE, TENNESSEE, A CORPORATION OF TENNESSEE.

PERFORATING-MACHINE.

1,389,618.	Specification of Letters Patent.	Patented Sept. 6, 1921.

Application filed October 23, 1918. Serial No. 259,363.

*To all whom it may concern:*

Be it known that I, GEORGE W. BINGHAM, a citizen of the United States, residing at Cleveland, in the county of Cuyahoga and State of Ohio, have invented a certain new and useful Improvement in Perforating-Machines, of which the following is a full, clear, and exact description, reference being had to the accompanying drawings.

This invention relates to improvements in machines for punching or perforating films used in motion picture apparatus, and has for its object the provision of a smooth running machine of this nature which is substantial, durable and not liable to get out of order, and which is very accurate in its operation, feeding the film with accuracy and precision, while punching the perforations therein in a clean cut manner and spacing them properly for coöperation with the sprockets of the moving picture apparatus.

A machine wherein the foregoing object is attained is illustrated in the accompanying drawings, and while I shall proceed to describe the same in detail, it will be understood that I do not limit myself to the structural details herein specifically described further than is required by the terms of the appended claims; and it will be further understood that this machine is not necessarily confined to the specific use above set forth, as it is clearly within the scope of the invention to utilize the machine for analogous purposes.

In the drawings Figure 1 is a plan view and Fig. 2 a side elevation of the perforating machine; Fig. 3 is a transverse section on the line 3—3 of the preceding figures; Fig. 4 is a section substantially on the line 4—4 of Fig. 2, looking in the direction of the arrows; and Fig. 5 is a fragmentary perspective view of the machine in the region of one of the punches.

The film, indicated at F in Figs. 3, 4, and 5, is fed across the longitudinal central portion of the base 1 between guides 2 having extensions 3 that are confined within transverse channels 4 cut through the elevated side portions of the base, such portions constituting, in effect, rails which are designated 5, the depth of the rails and guides 2 being shown as the same. While the guides 2 are shown in their extreme outer positions to receive between them a film of maximum width, it is clear that these guides may be moved inward for coöperation with films of less width where they may be locked by screws 8 which pass through slots 9 in the extensions 3 and are threaded into the base.

A guide 10 is supported in a vertical position above and transversely of the base, and the laterally extending lower ends 11 of its opposed uprights are secured to the base by screws 12. A head 14 is maintained in slidable engagement with the guide 10 by plates 15 that are secured to the uprights of the guides by screws 16. The head 14 is provided at each of its lower corners with blocks 17 having channels 18 within which the shanks of the punches 19 are confined.

The film F is guided between a stripper plate 20, and a die plate 21 having the matrices 22 wherewith the punches 19 coöperate, the stripper plate being provided with apertures 23 which register with the matrices of the die plate, while holes 24 are formed in the base 1 through which the punchings from the films may drop. The stripper and die plates are shown as held to the base as by screws 26. A drive shaft 28 extends transversely through and is journaled in the sides of the base, and beyond the left hand side of the base, as viewed in Fig. 3, it has applied to it a balance or flywheel 29 and a pulley 30 over which a belt may be engaged for driving the shaft, although it is clear that any suitable substitute means may be employed for this purpose.

An eccentric 32 is secured to the opposite end of the drive shaft, the same being encircled by an eccentric strap 33, and this strap is connected through a link 34, with the free end of an arm 35 attached to the adjacent end of a shaft 36 that is journaled within the upper ends of the opposed uprights of the guide 10. At about its middle, the shaft 36 has secured to it an arm 38 which projects out over the head 14 and is operatively connected thereto by means of a link 39 which has its lower end pivotally connected to a forward extension 40 of the head.

From this description it will be seen that as the shaft 28 is driven, it will oscillate the shaft 36 and reciprocate the head 14, thereby to actuate the punches 19 and perforate the film.

Mechanism for feeding the film during this punching operation so as to properly space the perforations along the film, will now be described. A shaft 42 extends transversely through and is journaled in the sides of the base 1 just to the left of the stripper and guide plates 20 and 21 (as viewed in Figs. 1 and 2), and this shaft has fixed to it a feed roller 43. A second feed roller 44 is supported in operative relation to the roller 43, on a shaft 45 having its ends journaled within depending lugs 46 of a frame 47. The side branches of the frame 47 overlie the outer sides of the uprights of the guide 10 and are pivoted thereto, as indicated at 48, the remote ends of the side branches being rigidly connected together by a cross beam 49, and yieldingly held downward by springs 50 that have their upper ends attached to the extreme ends of the side branches and their lower ends anchored, through pins or screws 51, to the base. Driving connection between the feed roller shafts 42 and 45 is established through gears 52 and 53 that are secured to the right hand ends of the respective shafts (as they are viewed in Fig. 4). The opposite end of shaft 42, where it projects beyond the boss of the base 1 wherein it is journaled, has fixed to it a ratchet gear 55, and beyond the ratchet gear it has journaled upon it a rocker arm 56. Pivoted to the upper end of the rocker arm, in the plane of the ratchet wheel is a pawl 57 that is urged to swing in a direction to engage its nose with the teeth of the ratchet by a leaf spring 58, secured to the arm and overlying the rear flattened end of the pawl. A connecting rod 60 has one of its ends pivoted to the lower end of the rocker arm 56, and its opposite end journaled upon a crank pin 61, carried by a segmental plate 62 that is pivoted at 63 to the eccentric 32, and the free end whereof is provided with an arcuate slot 64 through which a clamping screw 65 passes and is threaded into the eccentric, and through which the segmental plate may be clamped in any adjusted position to secure the crank pin 61 at a desired distance from the rotating axis of the eccentric. This provides an adjustable throw for the crank, and likewise for the rocker arm and pawl.

From the foregoing it is clear that an intermittent movement is imparted to the feed rolls 43 and 44 through their pawl and ratchet connection with the driving mechanism. This effects a step-by-step movement of the film which results in a proper spacing of the perforations produced by the punches 19, it being observed that the crank pin and eccentric are so related as to cause the punches to descend as the pawl 57 is retracted and while the feeding rolls are inactive.

Having thus described my invention what I claim is:

1. In a machine of the character set forth, the combination of a reciprocable punch, feeding means involving a rocker arm and situated in operative relation to the punch, an eccentric, operative connections between the eccentric and punch, a member pivoted to the eccentric, means for locking said member in various angular positions with respect to the eccentric, a crank pin carried by said member, and a connecting link journaled at one end upon the crank pin and pivoted at the other to the aforesaid rocker arm.

2. In a machine of the character set forth, the combination of a base, a guide rising therefrom and extending transversely of the base, a head reciprocable within the guide, punches carried by the head, a rock shaft journaled within the upper end of the guide, an arm carried by the shaft, a link connection between said arm and the head, a second arm carried by the shaft, a drive shaft sustained by the base, an eccentric on the drive shaft, operative connections between the eccentric and the last mentioned arm, a crank pin carried by the eccentric, film feeding means supported by the base in operative relation to the punch, and operative connections between said means and the crank pin.

3. In a machine of the character set forth, the combination of a base, a guide vertically disposed above the base and extending transversely thereof, punching means reciprocable within the guide, a shaft journaled within the base and extending transversely thereof adjacent the punching means, a feed roller secured to the shaft, a frame pivoted to the aforesaid guide and extending out over the feed roller, a second feed roller sustained by the frame in operative relation to the first feed roller, means tending to depress the frame, and driving mechanism having operative connections with one of the feed rollers and with the punching means.

In testimony whereof, I hereunto affix my signature.

GEORGE W. BINGHAM.